(12) United States Patent
Eaton et al.

(10) Patent No.: US 8,041,116 B2
(45) Date of Patent: Oct. 18, 2011

(54) IDENTIFYING STALE BACKGROUND PIXELS IN A VIDEO ANALYSIS SYSTEM

(75) Inventors: John Eric Eaton, Houston, TX (US); Wesley Kenneth Cobb, Woodlands, TX (US); Kishor Adinath Saitwal, Houston, TX (US); Bobby Ernest Blythe, Houston, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 811 days.

(21) Appl. No.: 12/129,551

(22) Filed: May 29, 2008

(65) Prior Publication Data
US 2009/0087086 A1    Apr. 2, 2009

Related U.S. Application Data

(60) Provisional application No. 60/975,565, filed on Sep. 27, 2007.

(51) Int. Cl.
*G06K 9/34* (2006.01)
*G06K 9/00* (2006.01)
(52) U.S. Cl. ........................... 382/173; 382/162
(58) Field of Classification Search .................. 382/173, 382/103, 162–167, 190, 194, 224–225, 203, 382/159–160; 345/589–604, 473, 581, 619–621, 345/629; 348/587, 592; 715/723
See application file for complete search history.

(56) References Cited

U.S. PATENT DOCUMENTS

| | | | |
|---|---|---|---|
| 6,532,022 B1 * | 3/2003 | Ahmad | 345/629 |
| 6,661,918 B1 * | 12/2003 | Gordon et al. | 382/173 |
| 7,308,136 B2 * | 12/2007 | Curry et al. | 382/164 |
| 7,929,729 B2 * | 4/2011 | Huang et al. | 382/103 |
| 2009/0087093 A1 * | 4/2009 | Eaton et al. | 382/173 |
| 2009/0087096 A1 * | 4/2009 | Eaton et al. | 382/190 |

OTHER PUBLICATIONS

S. Apewokin, et al. "Multimodal Mean Adaptive Backgrounding for Embedded Real-Time Video Surveillance," (2007) IEEE 6 pages.
Chris Stauffer, et al. "Adaptive Background Mixture Models for Real-Time Tracking," The Artificial Intelligence Laboratory, Massachussetts Institute of Technology 7 pages.
Ahmed Elgammal, et al. "Non-parametric Model for Background Substraction," Computer Vision Laboratory, University of Maryland 17 pages.
Ismail Haritaoglu, et al. "W4: Real-Time Surveillance of People and Their Activities," IEEE Transactions on Pattern Analysis and Machine Intelligence, vol. 22, No. 8 (Aug. 2000), pp. 809-830.
Yuri Ivanov, et al. "Video Surveillance of Interactions," MIT Media Laboratory, Cambridge, MA 8 pages.

(Continued)

*Primary Examiner* — Ishrat I Sherali
(74) *Attorney, Agent, or Firm* — Patterson & Sheridan, LLP

(57) ABSTRACT

Embodiments of the present invention provide a method and a module for identifying a background of a scene depicted in an acquired stream of video frames that may be used by a video-analysis system. For each pixel or block of pixels in an acquired video frame a comparison measure is determined. The comparison measure depends on difference of color values exhibited in the acquired video frame and in a background image respectively by the pixel or block of pixels and a corresponding pixel and block of pixels in the background image. To determine the comparison measure, the resulting difference is considered in relation to a range of possible color values. If the comparison measure is above a dynamically adjusted threshold, the pixel or the block of pixels is classified as a part of the background of the scene.

18 Claims, 7 Drawing Sheets

OTHER PUBLICATIONS

Chris Stauffer, et al. "Learning Patterns of Activity Using Real-Time Tracking," Artificial Intelligence Laboratory, Massachussetts Institute of Technology, Cambridge, MA 17 pages.

Pentti Kanerva, "Sparse Distributed Memory and Related Models," M.H. Hassoun, ed., Associative Neural Memories: Theory and Implementation, pp. 50-76. New York: Oxford University Press (1993).

Andrew Senior, et al. "Appearance Models for Occlusion Handling," IBM T.J. Watson Research Center, Yorktown, Heights, NY, 8 pages.

U.S. Appl. No. 12/129,539, filed May 29, 2008, entitled, "Dark Scene Compensation in a Background-Foreground Module of a Video Analysis System,".

U.S. Appl. No. 12/129,521, filed May 29, 2008, entitled, "Background-Foreground Module for Video Analysis System,".

* cited by examiner

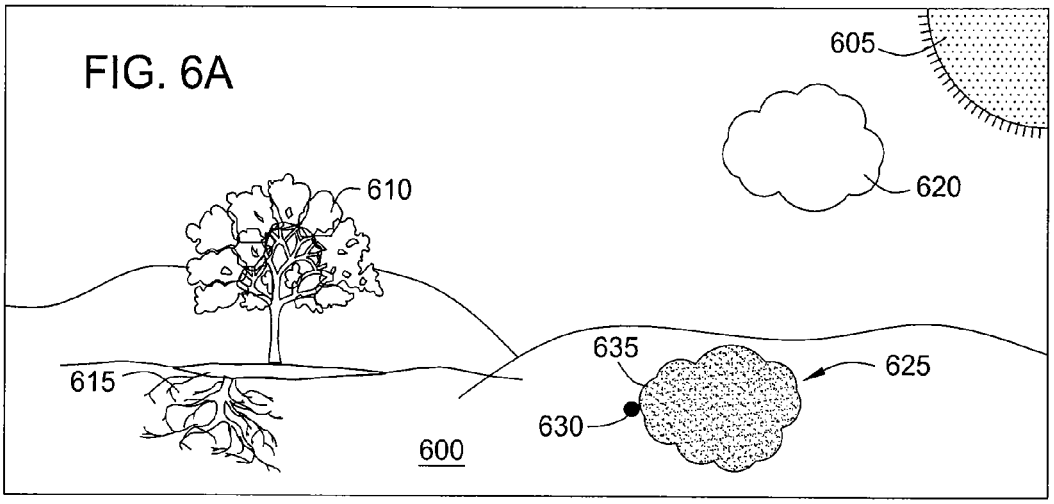
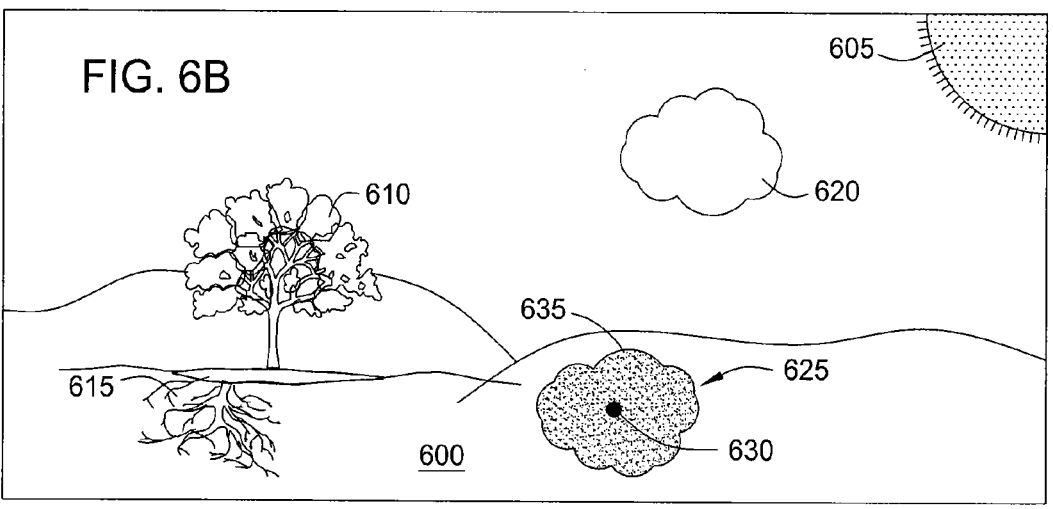
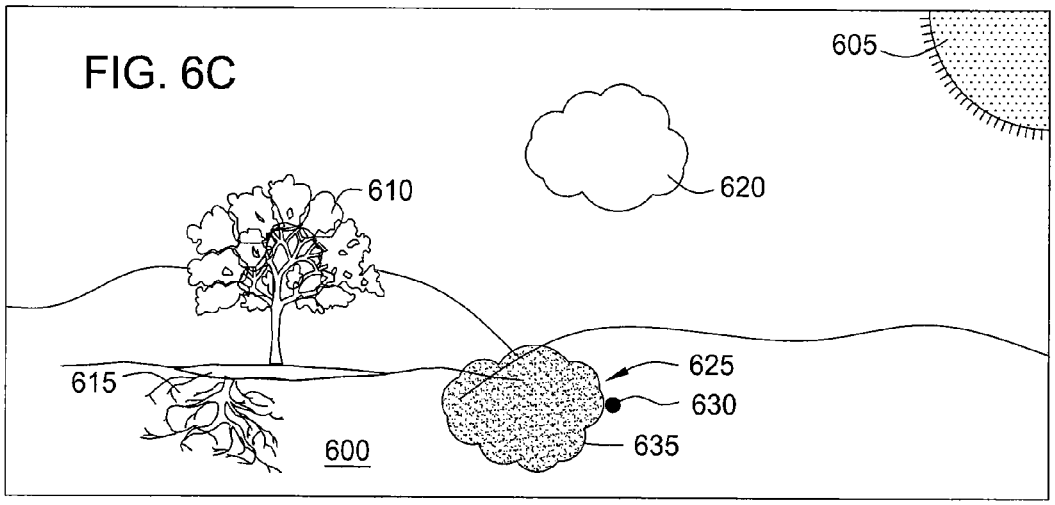

IDENTIFYING STALE BACKGROUND PIXELS IN A VIDEO ANALYSIS SYSTEM

CROSS-REFERENCE TO RELATED APPLICATIONS

This application claims benefit of U.S. Provisional Patent Application Ser. No. 60/975,565 filed Sep. 27, 2007. This application relates to commonly assigned, U.S. patent application Ser. No. 12/028,484 filed Feb. 8, 2008, entitled "Behavioral Recognition System", which are both herein incorporated by reference in their entirety.

BACKGROUND OF THE INVENTION

1. Field of the Invention

Embodiments of the present invention generally relate to analyzing recorded video, and more particularly to analyzing a stream of video frames to generate a background/foreground image of a scene depicted in the video frames.

2. Description of the Related Art

Some currently available video analysis systems include video content analysis capabilities. Such systems may be configured to analyze streams of video frames, whether recorded or in real-time, to detect abnormal behaviors or suspicious activities. However, many such video analysis systems lack efficiency in processing video content. For example, while the importance of isolating background and foreground images has been acknowledged, many of the video analysis systems fail in implementation. Furthermore, currently available video analysis systems are often inadequate in maintaining the background/foreground classification as objects move about a scene over time. Moreover, maintaining accurate background/foreground classifications when environmental conditions of the scene change has also been a challenge. For example, lighting changes over time, clouds casting shadows, or a car headlight in a dark parking garage can all disrupt the background/foreground classification process.

SUMMARY OF THE INVENTION

Embodiments of the present invention provide a method and a system for identifying a background/foreground of a scene. One embodiment of the invention includes a method for identifying a background of a scene depicted in a sequence of frames. The method generally includes receiving a current video frame of the sequence of frames. The method further includes determining a comparison measure for a block of pixels of the current video frame. The comparison measure is determined using a range of possible values of color-characteristics of the block of pixels, color-characteristic values of the block of pixels in the current video frame, and color-characteristic values of a corresponding block of pixels of a background image. The block of pixels may include one or more pixels. The method further includes classifying the block of pixels as the background of the scene when the comparison measure is above a pre-defined comparison measure threshold and classifying the block of pixels as a foreground of the scene otherwise.

Another embodiment of the invention includes a method for compensating for lighting darkness in a scene depicted by a sequence of video frames received from a video input source. This method may include buffering a plurality of video frames of the sequence of video frames and receiving a raw video frame of the sequence of video frames. Upon determining that a lighting level of at least one region of the raw frame is below a specified threshold, the method may also include generating a current video frame by assigning a compensated color-characteristic value to each pixel included in the at least one region. The compensated color-characteristic value for each respective pixel is calculated by averaging color-characteristic values of a corresponding pixel sampled from each of the buffered plurality of video frames. Once generated, the current video frame may be provided to a background-foreground module configured to identify which pixels in the current frame depict a portion of a background of the scene.

Still another embodiment includes a method for identifying stale background pixels in a background model of scene depicted in a sequence of video frames. This method generally includes receiving a raw video frame of the sequence of video frames, classifying a first set of one or more pixels of the raw video frame as depicting a portion of a background of the scene, and classifying a second set of one or more pixels of the raw video frame as depicting a portion of a foreground of the scene. For at least a first pixel classified as depicting a portion of the foreground of the scene, this method also includes (i) selecting a background pixel in the background image corresponding to the first pixel and a plurality of pixels in the background model neighboring the background pixel, (ii) determining a plurality of changes between color-characteristic values of the plurality of pixels in the background image and respective color-characteristic values of a corresponding plurality of pixels in a video frame previously used to update the color-characteristic values of the background pixel, and (iii) upon determining a difference between the change and the plurality of changes is within a specified threshold, classifying the background pixel in the background image as a stale background pixel. The method may further include updating the color-characteristic values of the background pixel in the background image using the color-characteristic values of the first pixel.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

FIGS. 6A-6C are examples of video frames illustrating gradual illumination problems, according to one embodiment of the present invention.

DETAILED DESCRIPTION

Figure 1:
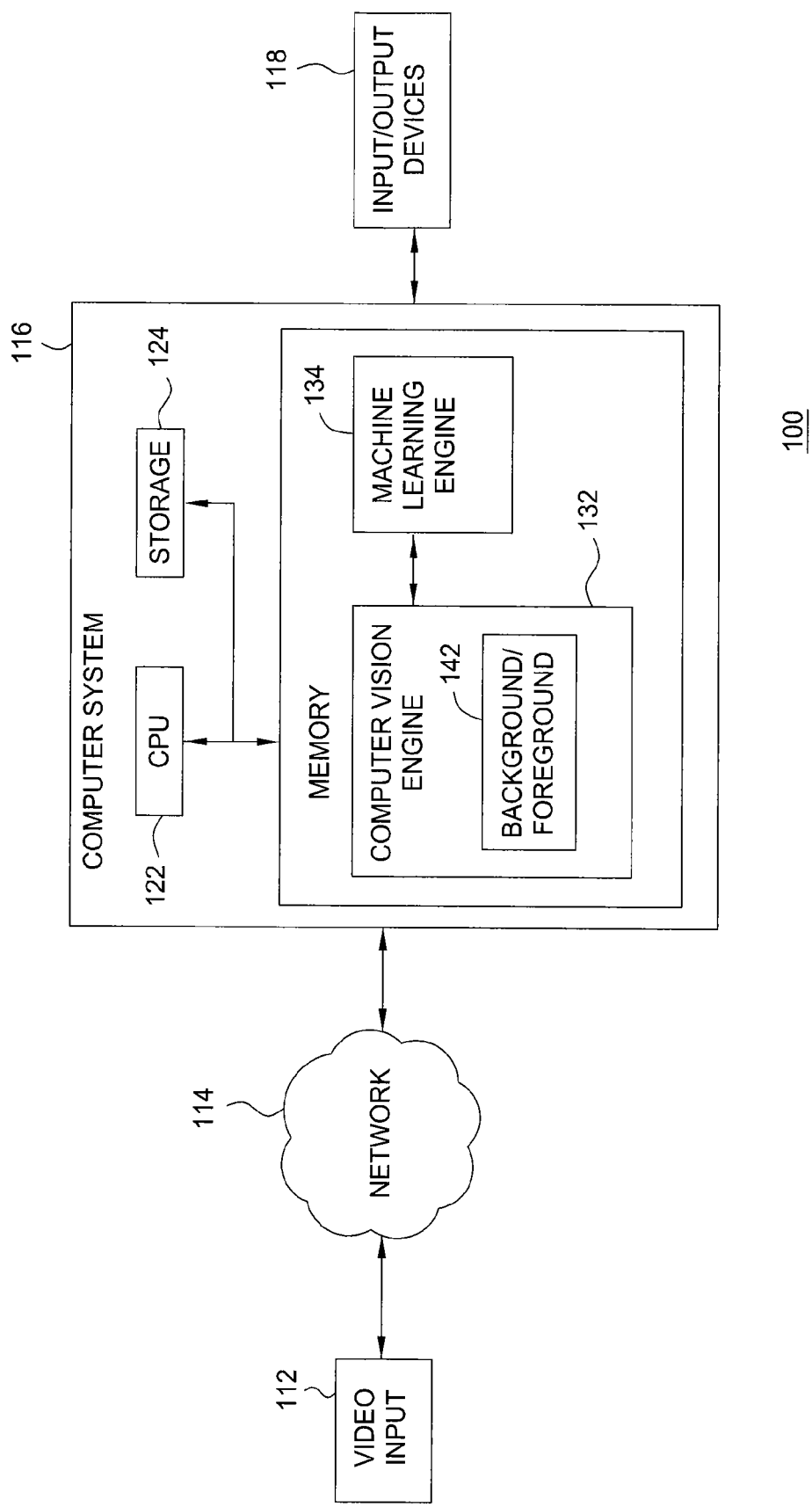
FIG. 1 illustrates components of a behavior-recognition system, according to one embodiment of the present invention.

Video analysis systems analyze information acquired from observations of an environment made over time. In context of the present invention, information from a video stream (i.e., a sequence of individual video frames) is analyzed. In particular, this disclosure describes techniques for identifying a background/foreground of a scene depicted in the video stream. Further, embodiments of the invention may be used to analyze information captured in the video stream and to identify and update background and foreground images of the scene. In one embodiment, content of the video stream is analyzed frame-by-frame where each frame is represented as a two-dimensional array of pixel color values. The background image depicts stationary elements of the scene built-up over a sequence of frames, while the foreground image includes volatile elements of the scene built-up over a sequence of frames. That is, the background image provides a stage upon which foreground elements may enter, interact with one another, and leave.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating components of a behavior-recognition system, according to one embodiment of the present invention. As shown, the behavior-recognition system 100 includes a video input 112, a network 114, a computer system 116, and input and output devices 118 (e.g., a monitor, a keyboard, a mouse, a printer, and the like).

The network 114 receives video data (e.g., video stream(s), video images, or the like) from the video input 112. The video input 112 may be a video camera, a VCR, DVR, DVD, computer, web-cam device, or the like. For example, the video input 112 may be a stationary video camera aimed at a certain area (e.g., a subway station, a parking lot, a building entry/exit, etc.), which continuously records the area and events taking place therein. Generally, the area visible to the camera is referred to as the "scene." The video input 112 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value). Further, the video stream may be formatted using known such formats e.g., MPEG2, MJPEG, MPEG4, H.263, H.264, and the like. The behavior-recognition system 100 may be configured to analyze this raw information to identify active objects in the stream, classify such elements, derive a variety of metadata regarding the actions and interactions of such elements and supply this information to a machine learning engine 134. In turn, the machine learning engine 134 may be configured to evaluate, observe, learn and remember what events transpire within the scene over time. Further, based on the "learning," the machine learning engine 134 may identify certain behaviors as anomalous.

The network 114 may be used to transmit the video data recorded by the video input 112 to the computer system 116. In one embodiment, the network 114 transmits the received stream of video frames to the computer system 116. Illustratively, the computer system 116 includes a CPU 122, storage 124 (e.g., a disk drive, optical disk drive, floppy disk drive, and the like), memory 126 containing a computer vision engine 132, and the machine learning engine 134. The computer vision engine 132 may provide a software application configured to analyze a sequence of video frames provided by the video input 112. For example, in one embodiment, the computer vision engine 132 may be configured to analyze video frames to identify targets of interest, track those targets of interest, infer properties about the targets of interest, classify them by categories, and tag the observed data. In one embodiment, the computer vision engine 132 generates a list of attributes (such as texture, color, and the like) of the classified objects of interest and provides the list to the machine learning engine 134. Additionally, the computer vision engine may supply the machine learning engine 134 with a variety of information about each tracked object within a scene (e.g., kinematic data, depth data, color, data, appearance data, etc.).

Further, as described in greater detail below, the computer vision engine 132 may process video frame data to distinguish between background elements of the scene and foreground elements of the scene. The background image may represent a static image of the scene, absent any foreground elements, built-up over a sequence of frames. Further still, in one embodiment, the computer vision engine 132 may be configured to identify different regions, or segments, of the background image and identify contextual information about each segment, e.g., whether one segment is in front of (or behind) another segment. From this information, the computer vision engine 132 may determine dimensionality and geometry of both background and foreground elements. For example, assume a computer vision engine has identified a blob of pixels as depicting a human individual. And further, that the blob is 30 pixels in height. This provides a convenient mechanism for estimating the size of objects in the scene, based on the average height of a person.

In one embodiment, the computer engine 132 may include a background-foreground module 142 implementing methodologies of the present disclosure. Generally, the background-foreground module 142 is configured to analyze video frames to identify and/or update sets of background and foreground images and/or background and foregrounds models for use by other components of the behavior-recognition system. Generally, the background model specifies how the background-foreground module evaluates scene imagery to compute and update a background image. Typically, the background image is defined as a two-dimensional array of pixel values specifying a color (or grayscale) value for the background depicted in the scene imagery. In one embodiment, the background-foreground module 142 uses pixel color characteristics/features/attributes of each video frame to identify which portions of a given frame depict part of the background image and which depict part of a foreground object, according to the background model.

Generally, the background image includes stationary elements of the scene being captured by the video input (e.g., pixels depicting a platform of a subway station), while the foreground image includes volatile elements captured by the video input (e.g., pixels depicting a man moving around the platform).

Typically, pixels that do not significantly change color over time are considered part of the background image of a scene while the rest of the pixels are considered to form foreground objects of the scene. Thus, in one embodiment, a background model may be generated by determining a color value for each pixel in a background image, where the model is "trained" using a sequence of video frames. For example, one approach includes determining an average of color values for a pixel over many frames and using the resulting as the background image. Of course, depending on the anticipated motion (and rate of motion) of foreground elements within the scene, more sophisticated approaches may be used. Once the background image is "trained," substantial changes in a color for a given pixel from a value "near" the background color to another color value may be interpreted as the appearance of a foreground object in the scene. Stated differently, for any given frame, each pixel with a color substantially the same as the background color of that pixel is classified as depicting a portion of the background image. Motions of the foreground objects may be determined based on differences between pixel color values in successive video frames. Therefore, the background image may be envisioned as a video frame of pixels having any foreground objects removed from the scene. And conversely, foreground images may be envisioned as pixels that occlude the background image or, alternatively, as a transparent video frame with patches of the foreground pixels.

In one embodiment, the machine learning engine 134 receives the video frames and the results generated by the computer vision engine 132. The machine learning engine 134 may be configured to analyze the received data, build semantic representations of events depicted in the video frames, detect patterns, and, ultimately, to learn from these observed patterns to identify normal and/or abnormal events. Data describing whether a normal/abnormal behavior/event has been determined and/or what such behavior/event is may be provided to output devices 118 to issue alerts, for example, an alert message presented on a GUI interface screen.

In general, the computer vision engine 132 and the machine learning engine 134 both process the received video data in real-time. However, time scales for processing information by the computer vision engine 132 and the machine learning engine 134 may differ. For example, in one embodiment, the computer vision engine 132 processes the received video data frame-by-frame, while the machine learning engine processes 134 the received data every N-frames. In other words, while the computer vision engine 132 analyzes each frame in real-time to derive a set of information about what is occurring within a given frame, the machine learning engine 134 is not constrained by the real-time frame rate of the video input.

Note, however, FIG. 1 illustrates merely one possible arrangement of the behavior-recognition system 100. For example, while the video input 112 is shown connected to the computer system 116 via the network 114, the network 114 is not always present or needed (e.g., the video input 112 may be directly connected to the computer system 116). Further, various components and modules of the behavior-recognition system may be implemented into other systems. For example, in one embodiment, the computer vision engine 132 may be implemented as a part of a video input device (e.g., as a firmware component wired directly into a video camera). In such a case, the outputs of the video camera may be provided to the machine learning engine 134 for analysis.

Moreover, while the background-foreground module 142 is depicted as a part of the computer vision engine 132, it may be implemented as a separate module placed into the memory 126. The background-foreground module 142 may also be implemented as a system separate from the computer system 116 or, alternatively, as a part of a different system. In such a case, the background-foreground module 142 may communicate with other components of the behavior-recognition system 100 via, for example, network 114. Furthermore, the methodologies described in the present disclosure, including the background-foreground module 142, may be implemented into any suitable video content analysis system to provide detailed information about particular objects in a scene.

Figure 2:
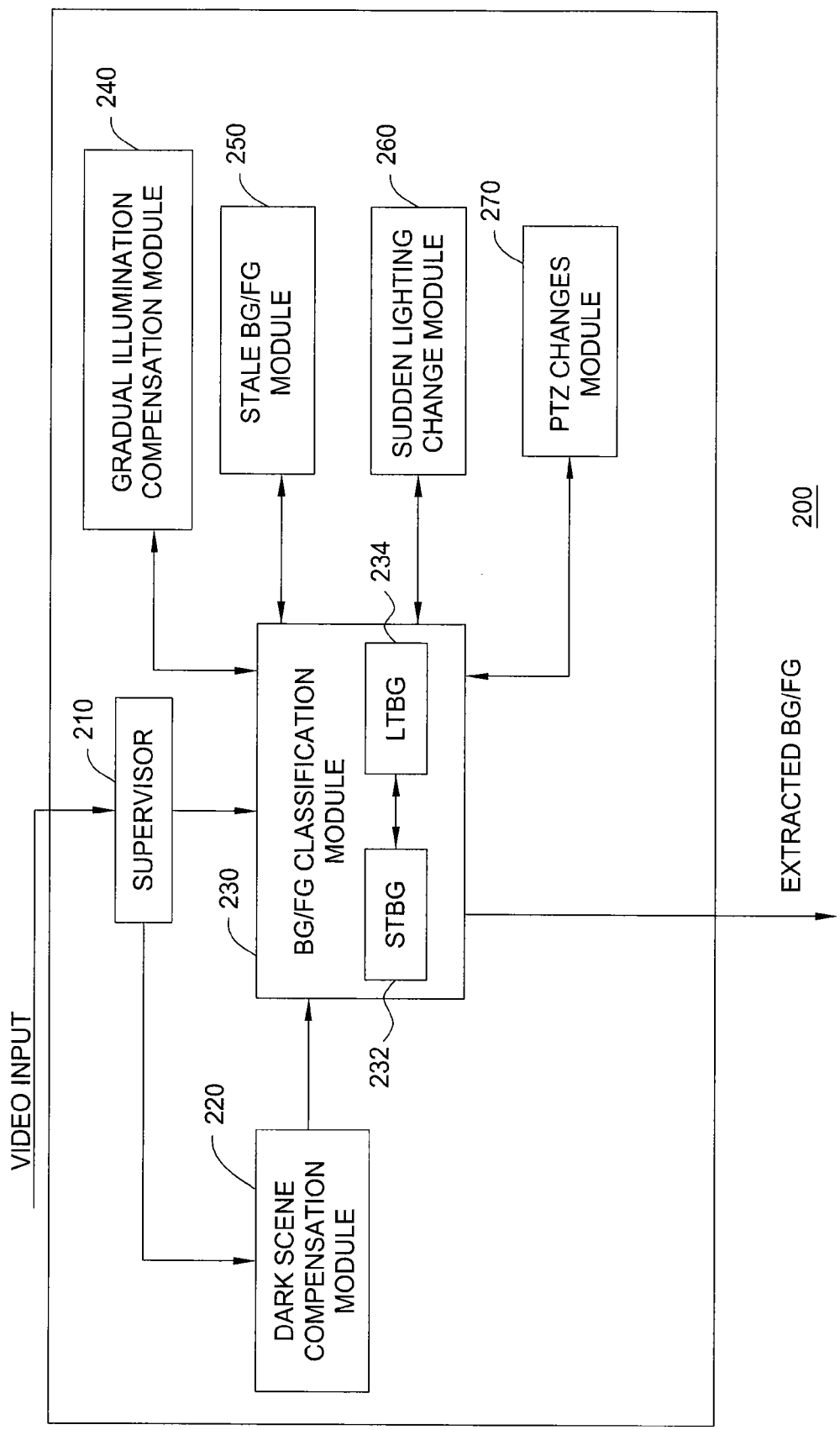
FIG. 2 illustrates components a background-foreground module, according to one embodiment of the present invention.

FIG. 2 illustrates a background-foreground module 200 of a video analysis system as well as the functionality and information flow of the background-foreground module 200, according to one embodiment of the present invention. As shown, the background-foreground module 200 includes a supervisor 210, a dark scene compensation module 220, a background/foreground (BG/FG) classification module 230, a gradual illumination compensation module 240, a stale background/foreground (BG/FG) module 250, a sudden lighting change module 260 and a pan-tilt-zoom (PTZ) change module 270.

A video input, such as a sequence of video frames, is supplied to the supervisor 210. In one embodiment, the supervisor 210 may be configured to provide the received video frames to the BG/FG classification module 230 directly (i.e., provide the raw frame) or provide a frame generated by dark scene compensation module 220. Generally, if the supervisor 210 determines that a scene is too dark to provide an accurate background/foreground classification for some region of the raw video frame (or even the entire frame), the supervisor 210 may pass the received video frames to the dark scene compensation module 220.

Generally, when a scene is dark, the amount of light reaching sensors of a video acquisition device, such as a video camera, is low, and thus, the signal is noisy. Consequently, pixels of video frames depicting a dark scene are unstable, i.e., the color value of a given pixel may fluctuate widely between frames. For example, in one embodiment, based on the Red-Green-Blue (RGB) color model where the RGB values range from 0 to 255, the scene is dark if least one of average RGB values for pixels of a video frame is lower than 50. Due to low RGB values, even small changes in the RGB values have significant effect in classification of pixels and may result in pixels being misclassified, such as classifying foreground pixels as background pixels and vice versa. For example, when an R channel value for a pixel is 4 in one video frame and 6 in another video frame, the difference between the two is only 2. However, because the R channel value is so low to begin with, the difference of 2 actually represents a fifty percent variance. In other words, because the video signal is weak, the noise swallows the video signal.

To address this issue, in one embodiment, the dark scene compensation module 220 smoothes such video signals, reducing the noise. To reduce the noise, the dark scene compensation module 220 calculates average color-characteristic values (such as RGB values) over a sequence of consecutive frames (e.g., 5 frames) and assigns the resulting average color-characteristic values to pixels of a current video frame. That is, when the scene (or region of the scene) is dark, the compensation module may substitute actual pixel color in the raw frame with an average determined from previous values of that pixel. In this manner, each video frame provided to other components of the background-foreground module 200 from the dark scene compensation module 220 is a rolling average of N preceding video frames.

The number of frames chosen to average the color-characteristic values may differ between different embodiments. Generally, using more frames in calculating average color-characteristic values, e.g. 10 frames instead of 2-5, allows for more accurate reflection by such values of objects depicted in the scene. On the other hand, using too many frames may cause blurring of the foreground, especially fast moving foreground objects, into the background. In one embodiment, the number of frames used to calculate average color-characteristic values depends on the observed environment, e.g., whether the environment is a slow changing or rapidly changing environment. Further yet, in another embodiment, the number of frames used to calculate average color-characteristic values may vary depending on a current level of darkness in the scene.

Note, however, that assigning average color-characteristic values as values of the currently received frame does not disrupt functionality of the other components of the background-foreground module 200, such as BG/FG classification module 230. In one embodiment, the other components of the background-foreground module 200 are simply unaware that a video frame they receive has been altered by the dark scene compensation module 220 to reduce noise of the video signal. Instead, running the video frames through the dark scene module 220 results in a short delay in identifying background and/or foreground information, similar to a delay in processing information by a person before his or her eyes adjust to darkness.

In contrast, there is no delay in bypassing the dark scene module when the supervisor 210 determines that the scene is not dark anymore, as such a determination may be made over one frame. Whether a scene is sufficiently dark may be determined by comparing color-characteristic values to a pre-defined threshold, such as comparing the RGB values to a pre-defined value (e.g., R channel value below 40). It should be noted that such a threshold may vary between different embodiments and may be tailored to the specific needs in an individual case, e.g., the type of environment depicted in the video frames. Furthermore different thresholds may be used for different color-characteristics of pixels, such as for different RGB channels, RGB values of different range (e.g., 0-255 vs. 0-65535), RGB values vs. YCbCr values, and so on.

Generally, the BG/FG classification module 230 analyzes pixels of a current video frame and classifies them as depicting a portion of scene background or a foreground element. Also, the BG/FG classification module 230 supports one or more background models to facilitate pixel classifications. In such a case, different background models each compute an independent background image for a given scene. As discussed previously, the background of the scene typically includes stationary elements of the scene, while the foreground of the scene includes volatile elements of the scene. Accordingly, changes in pixel characteristics over time (e.g., over a sequence of frames) are used to determine the background and foreground of the scene.

In one embodiment, a background model includes the same number of pixels having the same coordinates as the video frames. While a given pixel may depict background of the scene in one video frame and foreground of the scene in another video frame, the background model stores a set of pixel color-characteristics for each pixel representing the background of the scene. Further, pixels with color-characteristic values that do not significantly change over time may also be classified as background pixels. For example, after a foreground object appears within the scene it may become stationary (e.g., a car parks in a parking spot). In response, after a period of time, the set of foreground pixels depicting the foreground object may eventually dissolve into the background. Non-background pixels form a foreground of the scene.

Whether a given pixel is classified as depicting background or foreground of the scene may be determined for each frame in a sequence of video frames. For example, foreground elements may be identified by comparing color-characteristic values for a given pixel with the color-characteristic values of a corresponding pixel of the background image of the scene. Further, as video frames are received, the background image may be updated using additional information from successive frames. Such updates may improve the accuracy of the background image of the scene and allow the background model to adapt to changes in the scene.

Whether a particular pixel of the current video frame is classified as a background pixel may be determined using a comparison measure of that pixel. In one embodiment, the comparison measure is determined based on differences identified using color-characteristics of the pixel and color-characteristics of a corresponding pixel in the background image, where such differences are considered in light of a range of possible values of the color-characteristics. The pixel comparison measure may be compared to a pre-defined threshold to classify the pixel as a background or foreground pixel. In one embodiment, the pre-defined threshold depends on a type (e.g., bright, dark, and so on) assigned to the pixel. That is, the threshold applied to given comparison measure calculated for a pixel may be different, depending on attributes of the pixel. The comparison measure and its calculation and use are described in greater detail below, in conjunction with a discussion of FIG. 4.

As shown in FIG. 2, the BG/FG classification module may include a short-term background component (STBG) 232 and a long-term background component (LTBG) 234. Generally, these components may be used to maintain multiple background models of the scene. For example, in one embodiment, two background models are used—a short-term background model and a long-term background model. Typically, the short-term background model is updated more rapidly than the long-term background model. For example, when a new object appears in the scene (e.g., a floor lamp placed in a stationary position), the foreground object does not immediately become a part of either the short-term background model, or the long-term background model. Instead, pixels depicting the object are classified as being part of the foreground, i.e. as a foreground object. However, as time passes (e.g., video frames are received and analyzed) and the foreground object remains motionless, it becomes a part of the short-term background. In contrast, the long-term background may not incorporate pixels forming the foreground object for a longer period of time, or not at all. In other words, the short-term background model incorporates new objects in the scene into the background more readily than the long-term background model. Conversely, the long-term background model is more resistant to change.

The amount of time (or number of video frames) needed before a pixel classified as depicting a foreground object becomes classifieds as short-term and/or long-term background varies between embodiments and may depend on, for example, the nature of the observed environment. For example, for an outdoor scene, where the background changes rapidly (shading, movements of tree branches, and so on), a background model may need to be more adaptable than for an indoor scene, where the background may be more consistent. In one embodiment, it takes several frames before a pixel exhibiting consistent values becomes a part of the short-term background model. Therefore, for example, if a long car, such as a limousine, moves slowly through a parking lot, the middle part of the car may become a part of the short-term background model, but not of the long-term model. In another embodiment, once a foreground object has been identified as such, pixels classified as depicting that object do not become a part of the long-term background model while exhibiting color-characteristic values consistent with the identified foreground object.

Note however, results of the analysis made by the BG/FG classification module 230, including the classification of a pixel as depicting background or foreground and/or updates made to the short-term and long-term background models may be overridden via an outside input, for example, via a human interference. Alternatively, other components of the video-analysis system or behavior-recognition system may override the results of the BG/FG classification module 230. In one embodiment, components of computer vision engine 132, such as a tracker, context processor, and estimator-identifier, may re-classify an object (as represented by a collection of pixels) as depicting part of the background of the scene after this object has been classified as a foreground object by BG/FG classification module 230. For example, assume that a recorded scene depicts a parking lot having several parking spots. Assume further, that at some point in time a handicap parking sign is painted on one of the parking spot. Because the color-characteristic values of pixels depicting this parking sign have changed, the BG/FG classification module 230 may classify the handicapped parking sign as a foreground object. However, for example, when the tracker identifies that the handicapped sign is of no interest and should not be tracked, the tracker may signal to the BG/FG classification module 230 that the pixels depicting the handicapped parking sign should be classified as part of the background.

As shown in FIG. 2, the background-foreground module 200 may also include an illumination compensation module 240. In one embodiment, the illumination compensation module 240 may be configured to reduce the possibility of pixel misclassifications caused by lighting changes sweeping across a scene, such as changes caused by shadows. For example, as a shadow moves over a grassy field, the pixels at the leading edge of the shadow may be classified as a foreground object due to changes in color value, even though the pixels depict the background of the scene. Typically, pixels within a shadow do not become a part of the background model because when the shadow moves over the portion of the scene captured by a given pixel, the pixel values change with sufficient magnitude to be classified as being foreground.

To address the issue of pixel misclassification caused by lighting changes sweeping across a scene, the illumination compensation module 240 may be configured to perform a second evaluation of a pixel classified as being part of the foreground when the pixel is classified as being part of the foreground by a small amount. That is, when the pixel is within the threshold for being classified as foreground, but only within a marginal difference between the threshold and the pixel color values. How small before the magnitude of such a difference is considered "small" may be tailored to suit the needs of particular case. Further, a map of possible lighting compensation problems may be generated by calculating the difference between the threshold for background/foreground classification and the pixel values for each pixel in a given frame. Doing so creates a map where the leading (and trailing) edge of sweeping lighting changes (such as those caused by a shadow) may readily be identified. In such a case, a bias may be calculated that may push the classification of the pixel towards (or away from) the threshold as the leading edge of the shadow (or other sweeping lighting changes) crosses over a given pixel.

In one embodiment, the bias for given pixel values is calculated as an average pixel color value of pixels neighboring the given pixel. For example, consider a pixel just struck by the leading edge of a shadow and, as a result is classified as depicting a foreground object of the scene. In such a case, a number of pixels "ahead" of the leading edge of the shadow may still depict background using a brighter set of color values and another set of pixels "behind" the leading edge of the shadow may depict the background with a darker set of color values. By taking an average of these pixels (e.g., a grid of 9 pixels, with the given pixel in the center), the pixel just struck by the leading edge of the shadow may be reclassified as depicting scene background if the average color values are within the threshold for being classified as background. In this manner, the gradual illumination compensation module 240 helps to prevent misclassification of pixels that could have been caused by a leading edge of a rolling shadow (or other gradual lighting changes).

It should be noted that not every embodiment of the present invention applies the gradual illumination compensation module 240 while analyzing the stream of frames or even includes this module. For example, in one embodiment, where the observed environment is susceptible to causing a lot of marginal classifications (pixel comparison measures are close to pre-defined thresholds), it may be beneficial to omit using the gradual illumination compensation module 240 to avoid over re-classification. Alternatively, the thresholds or bias may be adjusted to improve background/foreground classifications.

In one embodiment, the stale BG/FG module 250 may be configured to identify stale background pixels, and in response, mature the background image when stale background pixels are discovered. A background pixel is considered "stale" when the color value associated with a given pixel becomes outdated from a current color of the background in the scene. This may result in a pixel that should be classified as depicting background in a given frame to become classified as a foreground pixel. Consider, for example, the following scenario. Assume a parking lot being monitored via video. In such a case, the empty parking lot would be classified as background and incorporated into a background image. That is, the color value of each pixel depicting the empty parking lot would become the color value assigned to a corresponding pixel in the background image. Assume further, that a car appears and parks in one of the parking spaces for a period of time. While parked, the car occludes a part of the background. Assume further that by the time the car leaves, environmental conditions of the parking lot have changed, e.g., the sun has set, and thus, it becomes darker. In such a case, the color values of regions of the parking lot not obstructed by the car may have been updated to reflect the gradual change in lighting. At the same time, however, the color-characteristic values of background image pixels depicting the part of the parking lot occluded by the car were not. Consequently, the color values of these pixels are the same as at the time before the car appeared in the parking lot. These pixels are stale.

As these stale pixels have not been updated, the corresponding pixels of the current video frame may be misclassified as foreground pixels, although these pixels depict the background of the scene, i.e., an empty parking space. Such misclassification occurs because of a mismatch between color values of the background image and color values of a background depicted in the current video frame. Another example along the same lines includes that of a car parked in a spot when the background image was trained. So long as the car remains stationery, it is properly classified as part of the background. However, once the car leaves, the region "uncovered" by the departure of the car ends up being classified as part of the foreground of the scene. In this latter example, a portion of the background has simply "left" the scene.

To avoid, or at least to reduce, misclassifications resulting from "stale" background pixels, the stale BG/FG module 250 may be configured to evaluates background pixels neighboring the stale background pixels and compares their color-characteristic changes from the time the foreground object appeared in the scene (e.g., the car parked) to the time the foreground object left the scene (e.g., the car left the parking spot) with the respective color-characteristic changes of the stale background pixels. If the changes are sufficiently similar, then the stale BG/FG module 250 modifies the background image by updating the color-characteristic values of the stale pixels to reflect the values of the current video frame. In one embodiment, this similarity may be determined by comparing differences between Euclidean distances representing changes to the color values of unobstructed pixels and the obstructed pixels to a pre-defined threshold. Aspects of the stale BG/FG module 250 are further described below in conjunction with FIGS. 5A-5C.

The sudden lighting change module 260 is generally responsible for identifying drastic changes in lighting of the scene. A drastic change in lighting may be caused, for example, by turning a light on and off. When lighting suddenly changes, the color-characteristic values change drastically as well (e.g., over a small sequence of frames, typically 4-5). Accordingly, the background image, as it was before the sudden lighting change, becomes practically useless for at least a period of time because values of the color-characteristics of pixels in the current video frame have changed, whether those pixels are foreground pixels or background pixels. In other words, the background pixels of the current video frame cannot be identified as such because they no longer match the pixels of the background image. In one embodiment, when a sudden lighting change occurs, the background image is reset and re-trained over a series of frames, starting with the frame in which the sudden lighting change occurred.

In one embodiment, the number of pixels classified as depicting scene foreground in a current video frame is compared with the number of pixels classified as depicting scene background in order to determine a sudden lighting change. Finding a drastic change between the current and previous foregrounds may indicate that a sudden lighting change has occurred. Thus, a foreground change between the current and previous foregrounds may be evaluated, for example, by calculating the difference between a total number of the foreground pixels of the current video frame and a total number of foreground pixels of the previous video frame. Alternatively, the foreground change is determined by calculating a number of background pixels of the previous video frame that became foreground pixels of the current video frame and comparing the number to a pre-defined threshold. For example, if the pixels classified as the foreground pixels of the current frame, but not as the foreground pixels of the previous frame, represent more than eighty percent of all foreground pixels of the current video frame, the foreground change is considered drastic.

Further, pixels depicting corners of objects in the current video frame may be analyzed to confirm whether a sudden lighting change has occurred. For example, if the color values of pixels depicting object edges or intersections between objects exhibit similar changes between two frames, then a sudden lighting change may be confirmed. In one embodiment, for each corner pixel a difference value is determined by calculating the difference between the corner pixel's color-characteristic values in the current video frame and the previous video frame. Then, the calculated difference values for all corner pixels are compared and if they are similar (e.g., do not differ more than a pre-defined threshold) the sudden lighting change is confirmed. Alternatively, the spatial-temporal neighborhood can be analyzed to check if the intensity changes are consistent with the effect of sudden illumination changes in that area.

The PTZ changes module 270 determines whether there is any pan, tilt, or zoom change in the scene indicating that the video acquisition device has been moved. In one embodiment, if such a change is determined, the background image is reset and other components of the behavior-recognition system are informed about the detected change so they may also reset their learning models.

Note, however, FIG. 2 illustrates merely one possible arrangement of the background-foreground module 200. Not all illustrated components are always present and/or needed. Furthermore, various components of the background-foreground module 200 may be implemented into the other components or combined with other components. For example, while the supervisor 210 as depicted only decides whether the dark scene compensation module 220 should be employed, in another embodiment, the supervisor 210 may also decide when and whether the other components (such as gradual illumination compensation module 240) of the background-foreground module 200 should be used in the video content analysis. Moreover, although the above described analysis of the video images were primarily explained on pixel-by-pixel basis, it is merely matter of convenience. The principles of the present invention may be similarly applied to blocks or groups of pixels.

Figure 3A:
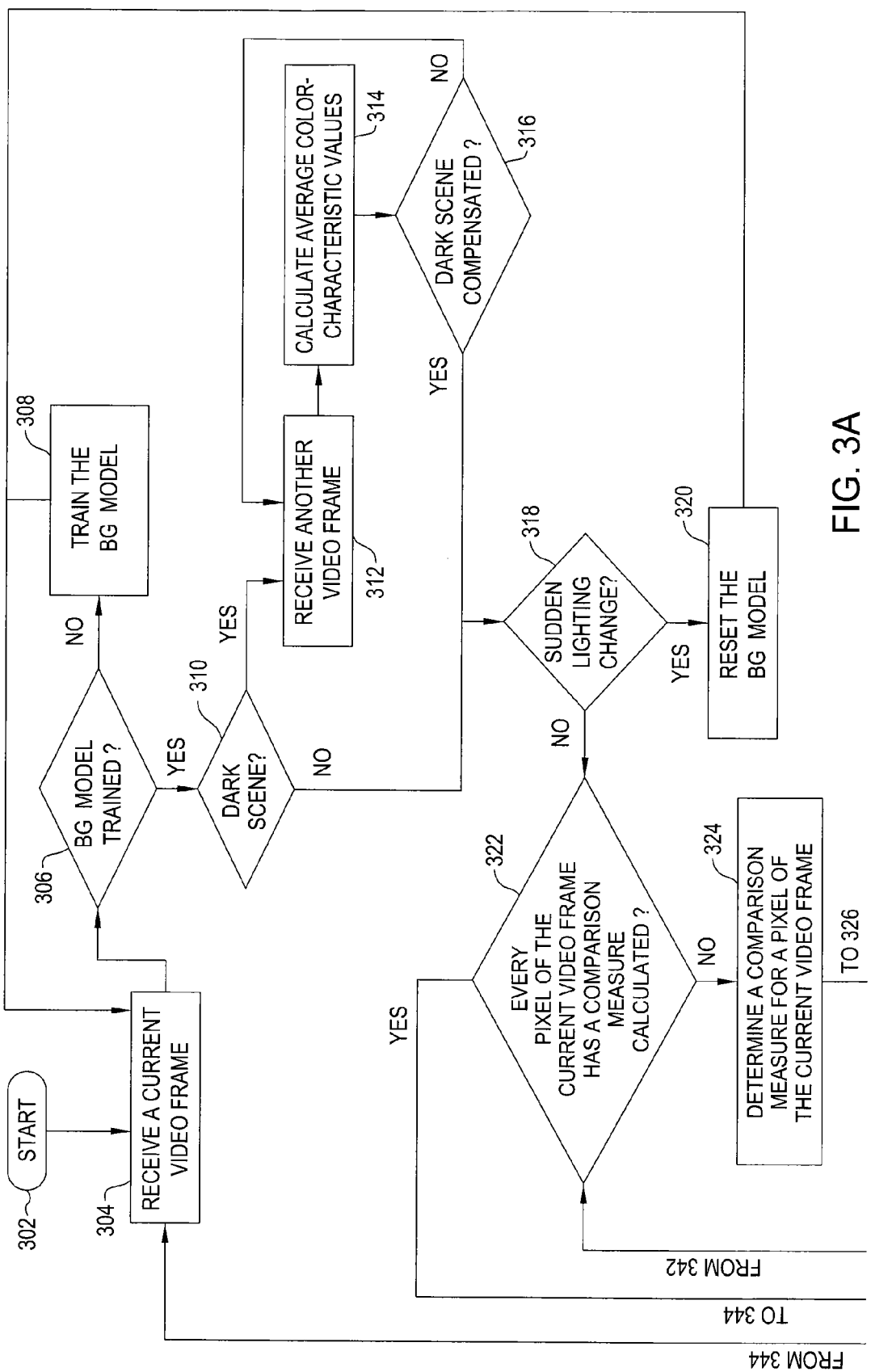
FIGS. 3A-3B are flow diagrams illustrating a method 300 for identifying a background of a scene depicted in a stream of video frames, according to one embodiment of the invention.
Figure 3B:
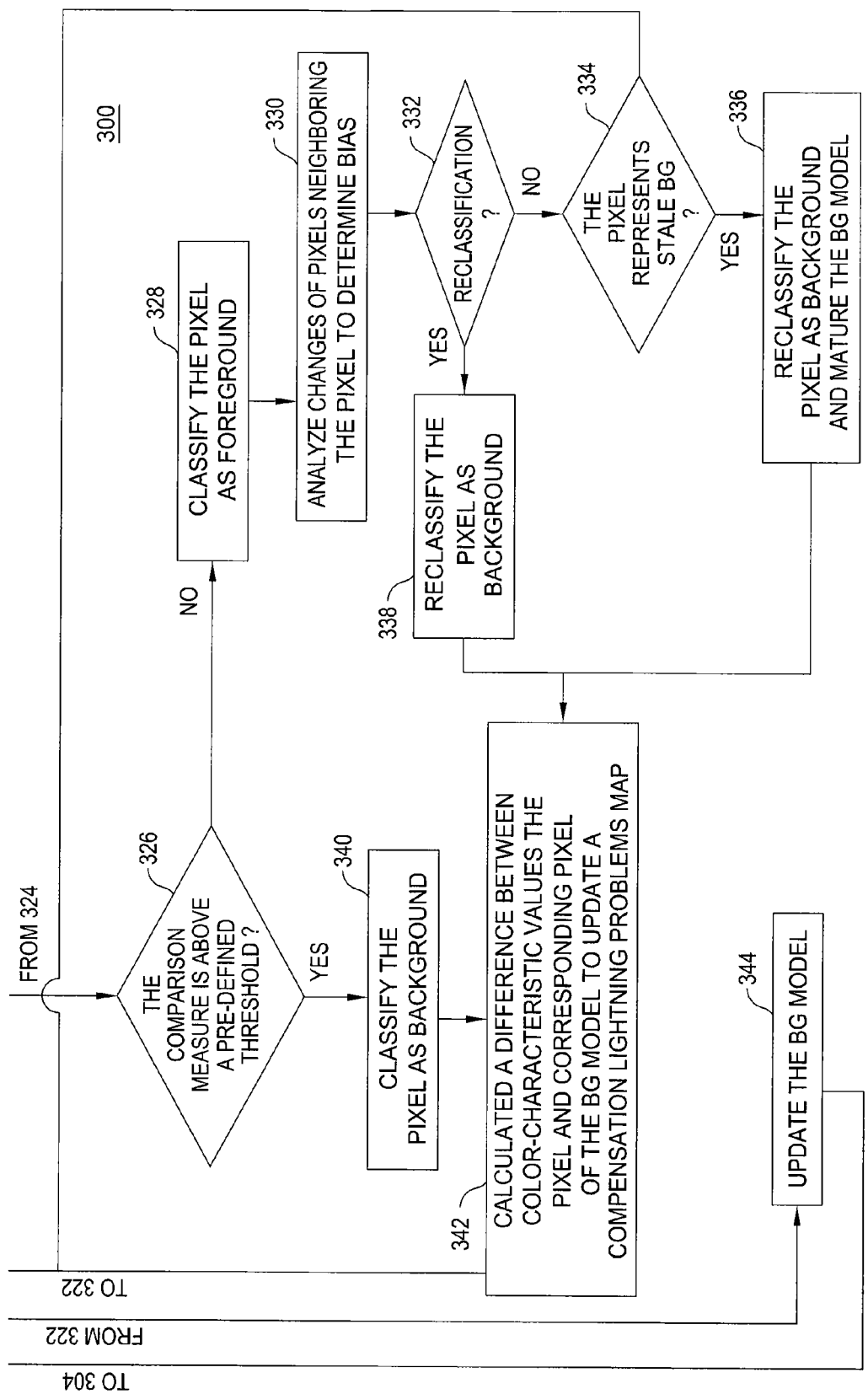

FIGS. 3A-3B are flow diagrams illustrating a method 300 for identifying a background of a scene depicted in a stream of video frames, according to one embodiment of the invention. As shown, the method 300 begins at step 302. At step 304, a current video frame (i.e., raw video frame) is received. At step 306, it is determined whether a background (BG) model of the scene has been trained. Typically, at the beginning of video analysis, the background model has not been trained yet. That is, the background model does not initially provide a model of the background of the scene. Also, in some circumstances, the background model may be reset and re-trained. In either case, if the background model has not been trained the method 300 continues with a step 308, where the background model is trained.

Generally, the background model is used to assign color-characteristic values determined by accumulating color-characteristic values (such as RGB values) of the pixels over a sequence of video frames (e.g., a few hundred frames). For example, a simple approach may be to simply calculate an average for each pixel from the values in each of the sequence of frames. However, a more sophisticated approach may filter frames determined to include outliers for some pixel values. As shown, the training includes steps 308, 304 and 306, which repeat until the background model is trained. As another alternative, an initial background image may be provided (e.g., a frame captured prior to any activity occurring within the scene). In such a case, no training is necessary. Of course, these, and other, approaches may be used to determine an initial background image for a given scene.

At step 310, the background foreground model 250 may determine whether the scene depicted in the current video frame is "dark." Generally, this may be determined by comparing color-characteristic values to pre-defined thresholds. Of course, the thresholds required to determine that the scene is dark may be tailored to suit the needs of a particular case. In any event, if at least one of the color-channels is below the pre-defined threshold, the supervisor module may determine that the scene is dark and the method 300 continues with step 312. Otherwise, the method 300 continues with step 318.

As discussed above, pixels forming a dark scene are typically unstable from frame-to-frame. To address this issue, at steps 312, 314, and 316, the color-characteristic values of the pixels are accumulated over a sequence of video frames and averages are calculated. As shown in FIG. 3, at step 316, it is determined whether the averages compensate for scene darkness. If the pixels have not been stabilized, an additional video frame is received (step 312) and the average color-characteristic values are calculated with the pixel characteristics of the additional frame (step 314). Otherwise, a video frame that includes pixels values calculated as an average of multiple frames is provided to the background foreground model as a current video frame.

In one embodiment, the dark scene determination is not necessary done for the whole video frame. Rather, dark regions of the current video frame are determined. In such an embodiment, the above-described steps 312, 314, and 316 are applied only to the pixels of the dark regions. Accordingly, a video frame provided after the completion of steps 312, 314, and 316 includes pixels of the dark regions having average color-characteristic values assigned as their current values and pixels, located outside of the dark regions having color-characteristic values of the raw video frame.

As discussed above in greater detail, a sudden lighting change may cause the misclassification of the background pixels as the foreground (e.g., lights turned on or off). To avoid such a misclassification, at step 318, it is determined whether the lighting of the scene has drastically changed. In one embodiment, a sudden increase in the amount of pixels classified as foreground pixels between the current and previous video frames indicate a sudden lighting change of the scene. Such a sudden lighting change may be further confirmed by evaluating whether corner pixels of the video frame exhibit similar changes (e.g., a Euclidian distance) indicating an overall change in scene lighting for the objects depicted in the scene. When a sudden lighting change occurs, the background model is reset (step 320), and the method 300 returns to step 304. Otherwise, the method 300 continues with step 322.

At step 322, it is determined whether a comparison measure has been calculated for each pixel of the current video frame. If so, the method 300 proceeds to step 344. Otherwise, at step 324, the comparison value for pixels of the current video frame is determined. As described below, the comparison measure may be determined based on a calculated difference between color-characteristics of a pixel and a corresponding pixel in the background model. In one embodiment, the calculated differences may be evaluated relative to a range of possible color-characteristic values. After the comparison measure has been determined, its value is compared to a threshold to classify the pixel of the current video frame as being part of either the background or foreground of the scene (step 324). Specifically, if the comparison value is above the threshold, the pixel is classified as the foreground of the scene (step 326). Otherwise, the pixel is classified as the background of the scene (step 340).

At step 330, the classification of a given pixel as depicting background or foreground may be evaluated to avoid potential misclassification due to by regional lighting changes (discussed above in regard to the gradual illumination compensation module 240). Specifically, at step 330, the pixel is analyzed to determine whether its color-characteristic values exhibit significant changes. For example, when a given pixel is only marginally classified as depicting scene foreground, an average set of color values may be calculated using the color values of a set of pixels neighboring the given pixel (step 332). If the calculated average value within the threshold for being classified as scene background, then the given pixel may itself be reclassified as scene background (step 338). This approach allows the leading (and trailing) edge of a shadow to sweep across a scene without causing pixels to be misclassified as being part of scene foreground.

If no re-classification occurs, then at step 334, it is determined whether the pixel represents a stale background pixel. Step 334 helps prevent pixels from being misclassified as part of the foreground when they, in fact, depict the background of the scene. As previously discussed, stale background pixels are pixels of the background image that have outdated color-characteristic values, relative to the actual background depicted in the scene. For example, if conditions of the scene change while a foreground object occludes the background, then, when the foreground object leaves the scene, the pixels may remain classified as foreground, because their color values do not match the color values of the existing background image.

To assure proper classification in such a scenario, at step 334, pixels of the background image neighboring a pixel corresponding to the pixel in question are located. The color-characteristic value changes of the neighboring pixels from the time of the last update of the corresponding pixel to the current point in time are determined. If the changes are sufficiently similar to the color-characteristic value changes of the pixel in question over the same period of time, then the corresponding pixel of the background image is a stale pixel. Accordingly, at step 336, the pixel of the current frame is re-classified as a background pixel and its color-characteristic values are used to update the color-characteristic values of the stale pixel of the background image and the method 300 proceeds to step 342. Otherwise, the method 300 returns to step 322.

At step 342, differences between the color-characteristic values of the pixel and of the corresponding pixel of the background image are determined. The calculated differences are stored in the compensation lighting problems map, which, as discussed, may be used at step 330. The method 300 returns to step 322 to evaluate additional pixels of the current video frame, according to steps 324-342.

Once the comparison measure has been calculated for each pixel of the current video frame, the background image of the scene may be updated (step 344) using information determined during the above-described analysis of the current video frame. After the background model has been updated, the method 300 returns to step 304 to receive the next raw video frame.

Although steps 322 through 342 are described as being performed on a pixel-by-pixel basis, in one embodiment, these steps are performed on block-by-block basis. Furthermore, it is not necessary to perform all of the above-described steps in the order named. Moreover, not all of the described steps are necessary for the described method to operate. Which steps should be used, in what order the steps should be performed, and whether some steps should be repeated more often than other steps is determined, based on, for example, the needs of a particular user, specific qualities of an observed environment, and so on.

For example, in one embodiment the background model is updated only every K frames. Alternatively, steps 330, 332, 338 and 342 may be omitted in some cases, e.g. where the scene depicts an indoor environment where gradual lighting changes are unlikely to occur. Similarly, not every described step need be performed on a pixel-by-pixel basis.

Figure 4:
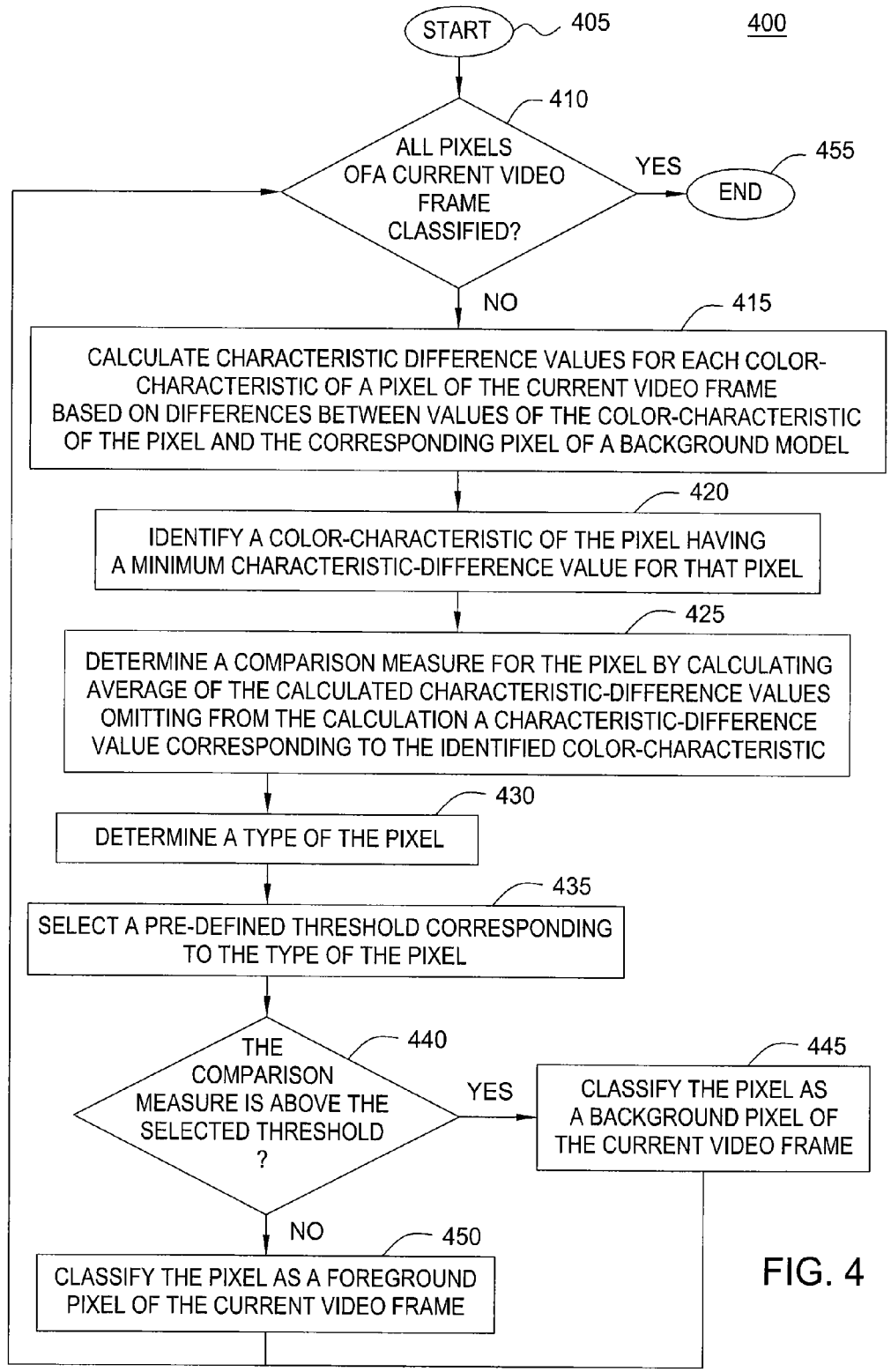
FIG. 4 is a flowchart illustrating a method for identifying a background of a scene using a comparison measure, according to one embodiment of the present invention.

FIG. 4 is a flowchart illustrating a method 400 for using a comparison measure to identify a background of a scene, according to one embodiment of the invention. The method 400 of FIG. 4 uses a pixel-based example for using a comparison measure to build a background image of a scene. Of course, other approaches may be used. For example, another approach to a background model includes a flow based approach which identifies moving (and non-moving) objects in the scene, and assigns the color values of the non-moving objects to the background image. The method 400 starts with step 405. At step 410, it is determined whether each pixel of a current video frame has been classified as being a background or foreground pixel. If so, the method 400 ends with step 455. Otherwise, if the current video frame still has unclassified pixels, the method 400 continues with step 415.

At step 415, a pixel of a current video frame is chosen for classification. For each color-characteristic of the pixel, a difference between color values of the pixel and color values of a corresponding pixel in the current background image. Generally, each pixel of the background image corresponds to a pixel of the current video frame sharing the same pixel coordinates. To facilitate this description of the method 400 the following example may be helpful. In this example, the color-characteristics of a pixel are defined using R, G, and B channels. Table 1 represents RGB values of one pixel of a current video frame and a corresponding pixel of a background image.

TABLE 1

| | RGB channels | | |
|---|---|---|---|
| | R | G | B |
| RGB values of a pixel of the current video frame - Rcf, Gcf, Bcf | 115 | 89 | 90 |
| RGB values of a corresponding pixel of the background image - Rbg, Gbg, Bbg | 129 | 72 | 6 |
| Absolute differences of the RGB values - \|Rbg − Rcf\|; \|Gbg − Gcf\|; \|Bbg − Bcf\| | 14 | 17 | 74 |

As shown in Table 1, values of the R, G and B channels of a pixel of the current video frame are 115, 86 and 90. Values of the R, G and B channels of the corresponding pixel of the background image are 129, 72, and 6. Accordingly, the differences in these channels ($\Delta R$, $\Delta G$ and $\Delta B$), may be calculated based on differences between values of the RGB channels of the pixel (namely, Rcf, Gcf or Bcf) and RGB values of the channels of the corresponding pixel (namely, Rbg, Gbg or Bbg). In one embodiment, the channel-differences $\Delta R$, $\Delta G$ and $\Delta B$ are calculated using the following equations:

$$\Delta_R = \frac{255}{|R_{bg} - R_{cf}| + 1} \quad (1)$$

$$\Delta_G = \frac{255}{|G_{bg} - G_{cf}| + 1} \quad (2)$$

$$\Delta_B = \frac{255}{|B_{bg} - B_{cf}| + 1} \quad (3)$$

Applying the equations (1), (2), and (3) to values contained in Table 1, the channel-difference values for the described example are the following: $\Delta R=17$, $\Delta G=15$ and $\Delta B=3.4$.

Note, although the above equations use 255 to represent the range of possible values of each of the RGB channels, the present invention is not limited to this number. For example, if RGB channels are 16-bit channels, the RGB values may vary from 0 to 65535. Furthermore, in one embodiment, a range of possible values corresponding to a type of a color-characteristic employed may be purposefully decreased, for example, to address specific characteristics of a video acquisition device. Further, the above-described equations are merely examples of equations used according to the principles of the present invention.

In one embodiment, to reduce video noise effects on pixel classification, for each pixel of the current video frame, a pixel color channel most affected by video noise is determined. Such a channel may be determined by identifying as the one having a minimum difference in the calculated difference values of the pixel (step 420). Thus, in the above-described example, $\Delta B$ (which is 3.4 compared to 17 of $\Delta R$ and 15 of $\Delta G$) is such a value.

At step 425, a comparison measure for the pixel is determined by calculating the average of the difference values. Note, however, the value identified at step 420 may be omitted from the calculations to reduce video noise effect on pixel classification. Accordingly, in the above-described example, the comparison measure is calculated as the average of ΔR and ΔG (which makes the comparison for this example pixel measure equal to 16), because ΔB, having the smallest value, is omitted from the calculations.

At step 430, a type of the pixel is determined. For example, brightness of the pixel may be used to determine its type. Because pixels of different brightness exhibit different physical properties, different pixel models may be employed. In one embodiment, the pixel may be one of the three types, namely bright (e.g., where at least one of the RGB channels is above 200), dark (e.g., where at least one of the RGB channels is below 50), and medium (e.g., the rest of the RGB values). It should be noted that more or less than three pixel types may be used. Furthermore, the RGB values provided are merely examples, and other RGB values may be used to define boundaries between the pixel types. For example, which RGB values are used to define pixel type boundaries may depend on overall brightness of the observed environment.

At step 435, a threshold for classifying a pixel as background versus foreground is selected based on the determined type of the pixel. As mentioned above, different types of pixels exhibit different properties. Accordingly, a dynamic threshold may be assigned and used to determine whether the pixel depicts background or foreground. That is, the thresholds assigned to different pixels may be assigned dynamically and vary based on the content of the video, e.g., based on how rapidly illumination levels change in a given neighborhood or region of the scene. For example, pixels in regions identified to have a large magnitude of change (i.e., more noise) from frame-to-frame would have a different threshold than pixels in regions depicting a well-lit area with little change in color values of an object depicted in the background from frame-to-frame.

In one embodiment, a volatility mask may be calculated to create a map of how much volatility is occurring in the pixel color values from frame-to-frame. The volatility mask may indicate how much pixel color values change frame-to-frame, when a given pixel depicts the same object within the scene (i.e., a color value change not due to the movement or introduction of an object into the foreground of the scene). Areas of high volatility (i.e., high-noise) have more tolerance to changes before declaring that a pixel depicting background in one frame depicts a foreground object in a subsequent frame. Thus, the thresholds for declaring a pixel as depicting background or foreground may adapt over time to changes in the scene and lighting conditions therein. Accordingly, different threshold values may be used to classify pixels of the current video frame as being part of background versus foreground. At step 440, the comparison measure of the pixel is compared to the selected threshold. If the comparison measure is above the threshold, then, at step 445, the pixel is classified as a background pixel of the current video frame. Otherwise, at step 450, the pixel is classified as a foreground pixel of the current frame. In either case, the method 400 returns to step 410.

It should be noted that it is not necessary to perform all of the above-described steps in the order named. Furthermore, not all of the described steps are necessary for the described method to operate. Which steps should be used, in what order the steps should be performed, and whether some steps should be repeated more often than other steps is determined, based on, for example, the needs of a particular user, specific qualities of an observed environment, and so on. For example, in one embodiment of the present invention, steps 430 and 435 are omitted. Instead, at step 440 the same threshold value (e.g., a change greater than 10) is used for every pixel, regardless of underlying brightness.

Also note, although method 400 is described on a pixel-by-pixel basis, in one embodiment, the described steps (including the classification step) are applied to groups of pixels. Moreover, although the above-described example uses the RGB values as color-characteristic values, the present invention is not limited to the RGB values. Other color-characteristic values may be used, for example, YCbCr values. Furthermore, while the RGB values provide for three types of the color-characteristics, namely R, G and B channels, the principles of present invention may be applied to color models having more than three color-characteristics, for example, the CMYK color model, which is a four color model.

Figure 5A:
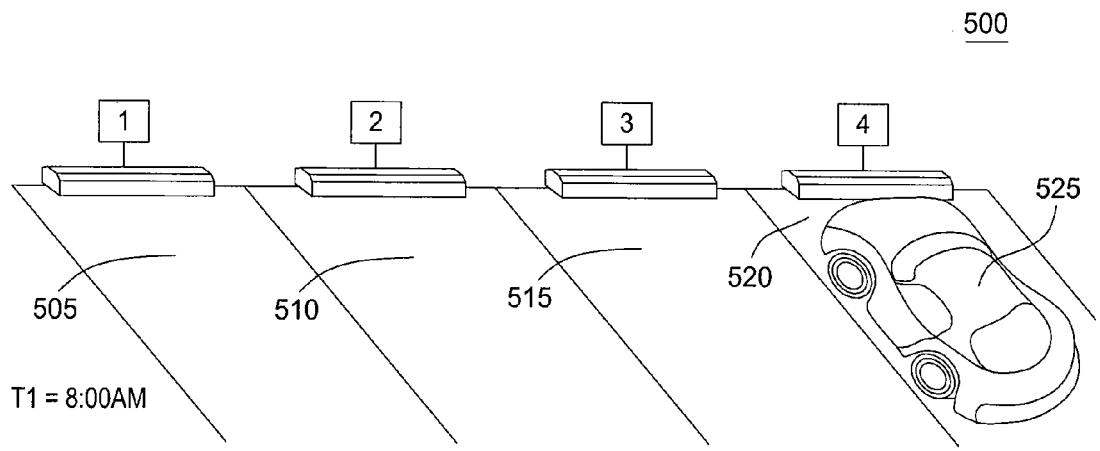
FIGS. 5A-5C are examples of video frames illustrating stale background pixels identification, according to one embodiment of the present invention.
Figure 5B:
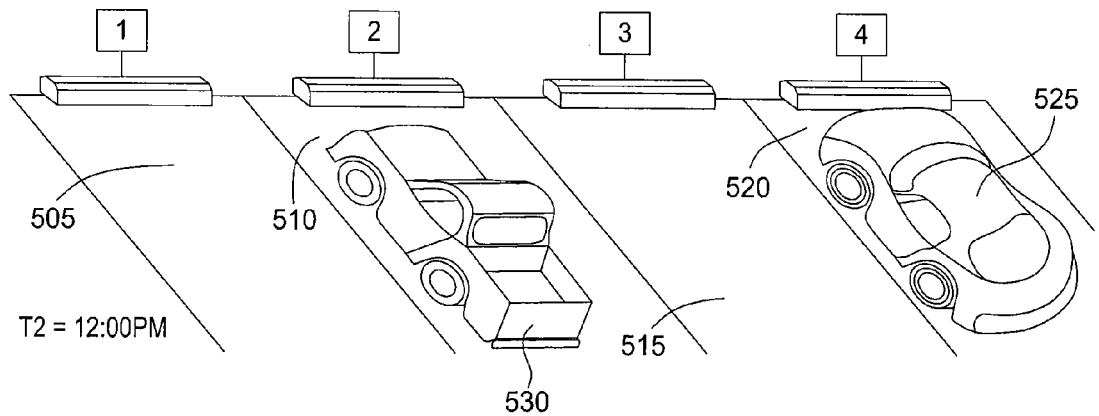
Figure 5C:
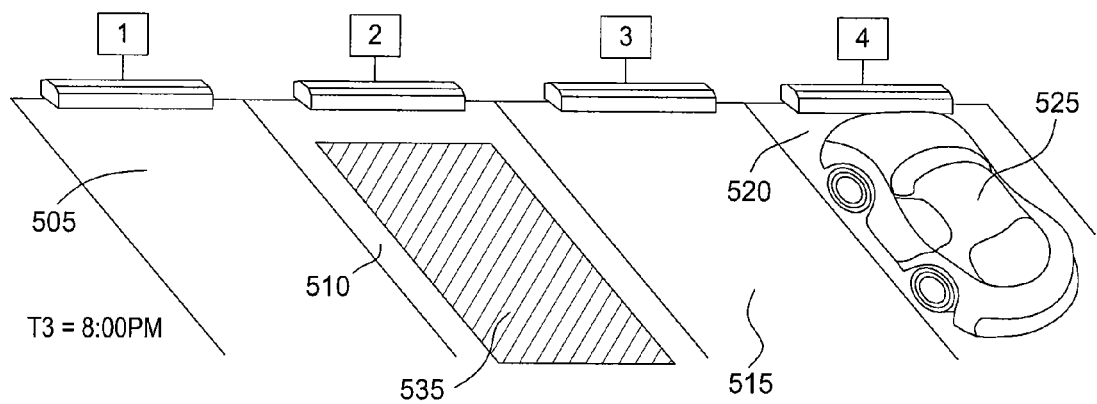

FIGS. 5A-5C illustrate examples of video frames depicting a scene taking place in a parking lot 500, according to one embodiment of the invention. Specifically, FIG. 5A illustrates the parking lot 500 at 8:00 AM, 5B illustrates the parking lot 500 between 8:01 AM and 8:59 PM, and 5C illustrates the parking lot 500 at 9:00 PM. In FIGS. 5A-5C, elements 505, 510, 515, and 520 respectively indicate parking spots 1-4 of the parking lot 500. According to the above-discussed principles of the present invention, a car 525 and a truck 530 may be considered parts of the foreground, while the parking spots 505, 510, 515, and 520 may be considered parts of the background (assuming the car 525 and the truck 530 appeared after the background model was trained). In other circumstances, the car 525 could be considered as a part of the background and background model. For example, if the background image has been trained with the car 525 already present in the scene, the car 525 will be part of the background until it leaves the scene. In such a case, the "hole" left when car 525 leaves would be misclassified as a foreground object.

In FIGS. 5A-5C, the parking spots 505 and 515 are empty, while the parking spot 520 is occupied by the car 525. The truck 530 is not shown at 8:00 AM (FIG. 5A). In FIG. 5B, the truck is shown having parked in the parking spot 510 between 8:01 AM and 8:59 PM (FIG. 5B), and shown having left the parking spot 510 at 9:00 PM (FIG. 5C). As the time elapses, the amount of light present in the scene changes. Thus, while FIG. 5A illustrates the parking lot 500 when the sun is up, FIG. 5C illustrates the parking lot 500 when the sun is setting, and thus it is significantly darker than in FIG. 5A. Consequently, the background pixels, including background pixels representing parking spots, have different color-characteristic values in FIGS. 5A and 5C.

Over time, between 8:00 AM and 9:00 PM the background image of the scene depicted in FIGS. 5A-5C is adapted to reflect changes in color-characteristic values. Thus, pixels of the background image have different pixel color values at 8:00 AM (FIG. 5A) than at 9:00 PM (FIG. 5C). Such changes take place gradually, as the lighting of the scene changes. As the background image is updated, the background pixels are gradually updated throughout the day.

Nevertheless, these changes take place only for pixels of the background image that remain visible to the video acquisition device. Therefore, while values of pixels in the background image that depict parking spots 505 and 515 may gradually change between 8:00 AM and 9:00 PM, the color values of the pixels representing an area 535 of the parking spot 515 have not changed because the truck 530 obstructs the area 535 during this period of time. As a result, when the truck 530 leaves the parking spot 515, the pixels of the background image representing the area 535 retain the color-characteristic values as determined at 8:00 AM, which are different from the color-characteristic values of the pixels representing the parking spots 505 and 515. The pixels of the video frame illustrated in FIG. 5C, which represent the area 535, may be classified as foreground pixels, because their color-characteristic values do not match the background image. The pixels of the background image representing the area 535 would be classified as stale background pixels.

As discussed above, to address such a problem, the stale BG/FG module 250 may be configured to analyze how neighboring areas, such as groups of pixels representing parking spots 505 and 515, have changed and compare the changes to the changes of color values of the pixels representing the area 535. If the stale BG/FG module 250 determines that the changes are similar (e.g., distance changes between the color-characteristic values for the pixels representing parking spots 505 and 515 are similar to distance changes for the color-characteristic values of the pixels representing the area 535), then the pixels of the background image corresponding to the area 535 may be updated with current values. In this example, the color values of the pixels of the video frame illustrated in FIG. 5C, which represent the area 535.

FIGS. 6A-6C illustrate examples of video frames showing gradual illumination problems identified according to one embodiment of the invention. Specifically, FIGS. 6A-6C show three video frames of an outdoor scene, where the lighting conditions for one of the pixels of the video frames, namely pixel 630, change between the shown frames. Illustratively, FIGS. 6A-6C each includes a sun 605, a tree 610, a tree shadow 615, a cloud 620, a cloud shadow 625 and pixel 630. The cloud 620 occupies different pixels in each of the shown video frames, moving towards the tree 610 between FIG. 6A and FIG. 6C. Similarly, the cloud shadow 625 moves toward the tree 610. It should be noted that there are no foreground objects shown in FIGS. 6A-6C.

As the cloud 620 moves, its cloud shadow 625 approaches the pixel 630 in FIG. 6A, overlaps the pixels 630 in FIG. 6B, and leaves the pixel 630 in FIG. 6C. Accordingly, the pixel 630 has different color-characteristic values as between FIGS. 6A and 6B and as between FIGS. 6B and 6C. The changes in the color-characteristic values take place just over one frame, namely when an edge 635 of the cloud shadow 625 first reaches the pixel 630, and then, when the edge 635 leaves the pixel 630 as the cloud shadow 625 leaves the pixel 630. Consequently, the changes are significant and may lead to classifying the pixel 630 as the foreground of the scene.

To reduce chances of such a misclassification, a map of existing compensation lighting problems is created and maintained. As discussed above, whenever a pixel of a current video frame is classified as a background pixel, a difference between the color-characteristic values of that pixel and the color-characteristic value of a corresponding pixel of the background image is measured and stored as a part of the map. Accordingly, such a map created and maintained fro the scene of FIGS. 6A-6C includes each pixel of the depicted scene as there are no foreground objects present.

When the edge 635 of the cloud 625 overlaps the pixel 630 for the first time, the pixel 630 may initially be classified as being part of the foreground. Accordingly, pixels neighboring the pixel 630 are evaluated using values acquired from the map of compensation lighting problems and the average change value is calculated to determine whether a pixel of the background image corresponding to the pixel 630 is a stale background pixel. As each grass pixel, overlapped by the cloud shadow 625, exhibits a significant change in its color-characteristic value, the calculated average change value should also exhibit a similar change. Accordingly, classification of the pixel 630 will be biased towards being classified as the background. A similar scenario occurs when the trailing edge of the cloud 635 together with the cloud 620 leaves the pixel 630. In this manner, the pixel 630 is re-classified as the background pixel despite significant changes in its color-characteristic values.

Advantageously, as described herein, embodiments of the invention enable identifying background and foreground images of a scene depicted by a stream of video frames and maintaining the background/foreground classification as objects move about the scene over time. Furthermore, embodiments of the invention enable maintaining accurate background/foreground classification of the scene, when the scene its regions are dark and/or when lighting conditions of the scene change over time or occur only in parts of the scene. Moreover, embodiments of the invention enable classifying accurately background pixels that were occluded by foreground objects while the conditions of the scene were changing.

While the foregoing is directed to embodiments of the present invention, other and further embodiments of the invention may be devised without departing from the basic scope thereof, and the scope thereof is determined by the claims that follow.

The invention claimed is:

1. A method for identifying stale background pixels in a background model of scene depicted in a sequence of video frames, the method comprising:
   receiving a raw video frame of the sequence of video frames;
   classifying a first set of one or more pixels of the raw video frame as depicting a portion of a background of the scene;
   classifying a second set of one or more pixels of the raw video frame as depicting a portion of a foreground of the scene;
   for at least a first pixel classified as depicting a portion of the foreground of the scene:
      selecting a background pixel in the background model corresponding to the first pixel and a plurality of pixels in the background model neighboring the background pixel,
      determining a plurality of changes between color-characteristic values of the plurality of pixels in the background model and respective color-characteristic values of a corresponding plurality of pixels in a video frame previously used to update the color-characteristic values of the background pixel, and
      upon determining a difference between the change and the plurality of changes is within a specified threshold, classifying the background pixel in the background model as a stale background pixel; and
      updating the color-characteristic values of the background pixel in the background model using the color-characteristic values of the first pixel.

2. The method of claim 1, further comprising, upon determining the plurality of changes is within the specified threshold, re-classifying the first pixel as depicting a portion of a background of the scene.

3. The method of claim 1, wherein color-characteristics are selected from a group consisting of a Red (R) color-channel, a Green (G) color-channel, and a Blue (B) color-channel.

4. The method of claim 1, wherein the background model includes a background image composed from a plurality of pixel color values, and wherein the background images depicts static elements of the scene depicted in the sequence of video frames.

5. The method of claim 1, wherein the operation further comprises updating the background model using the first set of one or more pixels.

6. The method of claim 1, wherein the background model includes a short-term background model and a long-term background model.

7. A computer-readable storage medium containing a program which, when executed by a processor, performs an operation for identifying stale background pixels in a background model of scene depicted in a sequence of video frames, the operation comprising:
  receiving a raw video frame of the sequence of video frames;
  classifying a first set of one or more pixels of the raw video frame as depicting a portion of a background of the scene;
  classifying a second set of one or more pixels of the raw video frame as depicting a portion of a foreground of the scene;
  for at least a first pixel classified as depicting a portion of the foreground of the scene:
    selecting a background pixel in the background model corresponding to the first pixel and a plurality of pixels in the background model neighboring the background pixel,
    determining a plurality of changes between color-characteristic values of the plurality of pixels in the background model and respective color-characteristic values of a corresponding plurality of pixels in a video frame previously used to update the color-characteristic values of the background pixel, and
    upon determining a difference between the change and the plurality of changes is within a specified threshold, classifying the background pixel in the background model as a stale background pixel; and
    updating the color-characteristic values of the background pixel in the background model using the color-characteristic values of the first pixel.

8. The computer-readable storage medium of claim 6, wherein the operation further comprises, upon determining the plurality of changes is within the specified threshold, re-classifying the first pixel as depicting a portion of a background of the scene.

9. The computer-readable storage medium of claim 6, wherein color-characteristics are selected from a group consisting of a Red (R) color-channel, a Green (G) color-channel, and a Blue (B) color-channel.

10. The computer-readable storage medium of claim 6, wherein the background model includes a background image composed from a plurality of pixel color values, and wherein the background images depicts static elements of the scene depicted in the sequence of video frames.

11. The computer-readable storage medium of claim 6, wherein the operation further comprises updating the background model using the first set of one or more pixels.

12. The computer-readable storage medium of claim 6, wherein the background model includes a short-term background model and a long-term background model.

13. A system, comprising:
  a video input source configured to provide a sequence of video frames, each depicting a scene;
  a processor; and
  a memory containing a video analysis application, which when executed by the processor is configured to perform an operation for identifying stale background pixels in a background model of scene depicted in a sequence of video frames, the operation comprising:
    receiving a raw video frame of the sequence of video frames,
    classifying a first set of one or more pixels of the raw video frame as depicting a portion of a background of the scene,
    classifying a second set of one or more pixels of the raw video frame as depicting a portion of a foreground of the scene, and
    for at least a first pixel classified as depicting a portion of the foreground of the scene:
      selecting a background pixel in the background model corresponding to the first pixel and a plurality of pixels in the background model neighboring the background pixel,
      determining a plurality of changes between color-characteristic values of the plurality of pixels in the background model and respective color-characteristic values of a corresponding plurality of pixels in a video frame previously used to update the color-characteristic values of the background pixel, and
      upon determining a difference between the change and the plurality of changes is within a specified threshold, classifying the background pixel in the background model as a stale background pixel; and
      updating the color-characteristic values of the background pixel in the background model using the color-characteristic values of the first pixel.

14. The system of claim 13, further comprising, upon determining the plurality of changes is within the specified threshold, re-classifying the first pixel as depicting a portion of a background of the scene.

15. The system of claim 13, wherein color-characteristics are selected from a group consisting of a Red (R) color-channel, a Green (G) color-channel, and a Blue (B) color-channel.

16. The system of claim 13, wherein the background model includes a background image composed from a plurality of pixel color values, and wherein the background images depicts static elements of the scene depicted in the sequence of video frames.

17. The system of claim 13, wherein the operation further comprises updating the background model using the first set of one or more pixels.

18. The system of claim 13, wherein the background model includes a short-term background model and a long-term background model.

* * * * *